United States Patent [19]
Karr

[11] 3,877,358
[45] Apr. 15, 1975

[54] CARBONATED BEVERAGE SYSTEM

[75] Inventor: Fred A. Karr, Redwood City, Calif.

[73] Assignee: Shasta Beverages Division of Consolidated Food Corporation, Hayward, Calif.

[22] Filed: Mar. 27, 1974

[21] Appl. No.: 455,182

Related U.S. Application Data
[62] Division of Ser. No. 264,343, June 19, 1972, Pat. No. 3,832,474.

[52] U.S. Cl. .......................... 99/275; 141/5; 141/6; 426/365
[51] Int. Cl. ............................................. C02d 1/02
[58] Field of Search .......... 99/275, 276, 277.1, 278; 141/5, 6; 426/477, 474, 365, 312, 404

[56] References Cited
UNITED STATES PATENTS

| | | | |
|---|---|---|---|
| 1,275,622 | 8/1918 | Smith | 141/6 |
| 3,090,293 | 5/1963 | Plock | 99/275 |
| 3,256,802 | 6/1966 | Karr | 99/275 |
| 3,395,739 | 8/1968 | Friendship | 141/6 |
| 3,634,107 | 1/1972 | Cornelius | 99/275 |

Primary Examiner—Robert W. Jenkins
Attorney, Agent, or Firm—Flehr, Hohbach, Test, Albritton & Herbert

[57] ABSTRACT

A system for continuously preparing a carbonated product and filling containers. Carbon dioxide is applied to a liquid under carbonating pressure and the carbonated liquid is passed to a stabilizing tank maintained at a pressure at least equal to carbonating pressure. Thereafter, the liquid is directed to a pressure reduction tank in which the pressure is lowered to a level just sufficient to produce the desired flow rate to the filler. By reducing the pressure prior to filling, a filler of the gravity or vacuum type may be employed without excessive foaming. Or, if a counter pressure filler is employed, operating pressure is considerably lowered.

8 Claims, 1 Drawing Figure

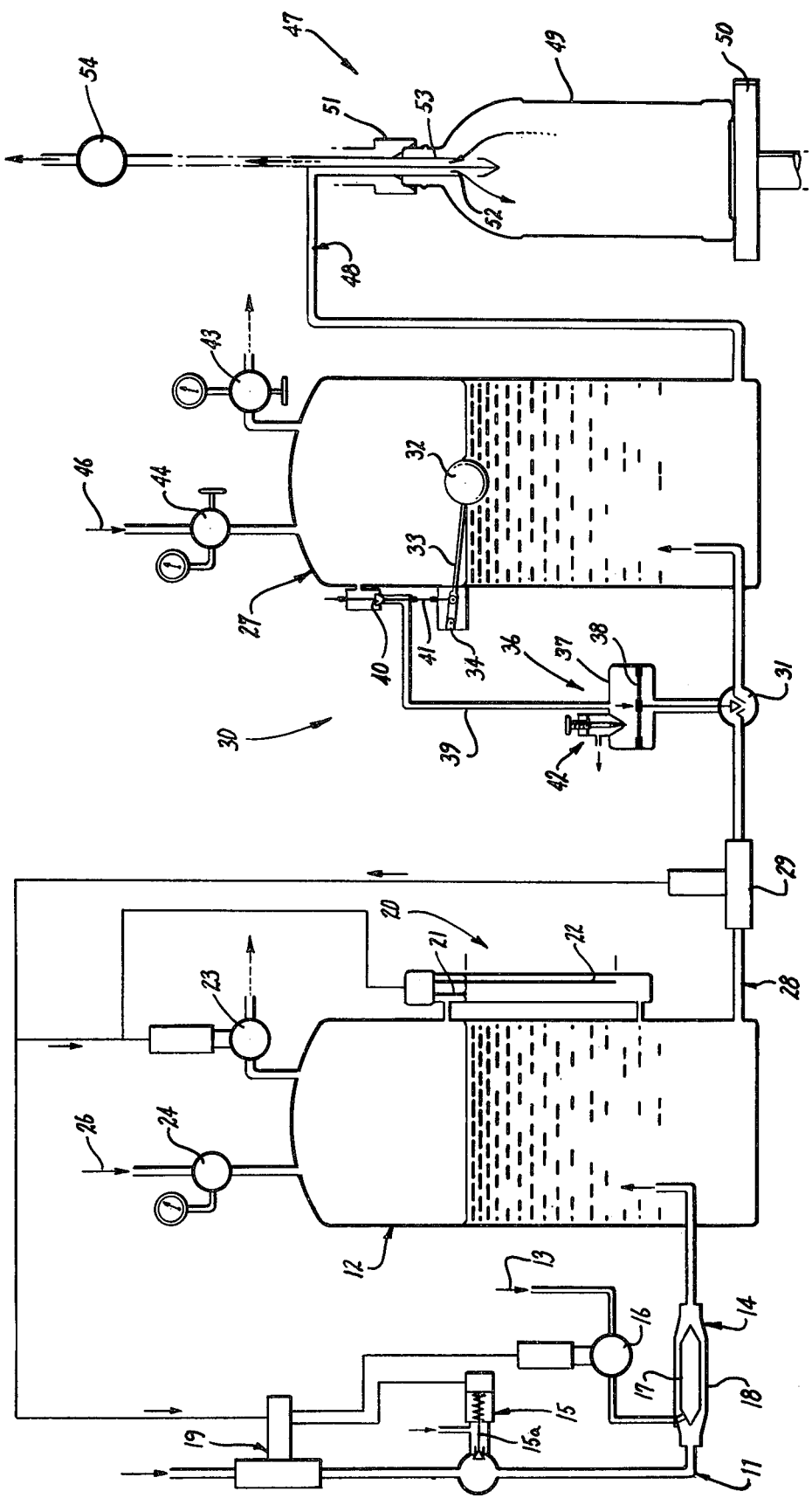

CARBONATED BEVERAGE SYSTEM

This is a division of my application Ser. No. 264,343, filed June 19, 1972, now U.S. Pat. No. 3,832,474.

BACKGROUND OF THE INVENTION

For the production of high quality carbonated beverages and filling containers (e.g., bottles or cans) therewith, it is important to maintain a constant reproducible level of carbonation for a particular beverage. One known continuous carbonation system which accomplishes this object is fully described in U.S. Pat. No. 3,256,802. In accordance with that patent, an inline carbonator is employed in which carbon dioxide in the aqueous liquid state is injected into a stream of liquid to be carbonated in a conduit through an injection valve therein. Thereafter the carbonated beverage is directed to a stabilizing tank maintained at a pressure in excess of the theoretical carbon dioxide saturation pressure (known as the "carbonating pressure") which is the pressure necessary for stabilizing the carbon dioxide in the beverage. Reference may be made to a standard gas volume test chart to illustrate the carbonating pressure to dissolve a given volume of carbon dioxide dissolved by one volume of water as a function of temperature. After stabilization, which may increase to relatively high levels as the desired degree of carbonation increases, the beverage is directed to the bowl of a counter pressure filler. Cans or bottles are filled by first applying a counter pressure to the container interior less than the product pressure by an amount selected to provide the desired flow rate. For example, for a product flow rate of 15 to 20 G.P.M., the pressure drop in the filler bowl is on the order of 2 to 3 p.s.i.g. below the pressure in the stabilizing tank.

Counter pressure fillers are employed in the above system for moderately to highly carbonated beverage to counterbalance the excessively high filling flow rates which would otherwise result from direct or gravity filling under the back pressure necessary in the stabilizing tank resulting in excessive foaming and control problems. Such filler equipment requires considerable capital outlay and is expensive to install. It is desirable to employ the lowest feasible operating pressure in the counter pressure filler to reduce the wear on the pressurized cylinders and to reduce general maintenance costs. Also, low pressures reduce container damage due to high pressure.

OBJECTS AND SUMMARY OF THE INVENTION

It is a general object of the invention to provide an improved carbonation system with controlled prefiller pressure reduction without excessive decarbonation of the product.

It is a particular object of the invention to either eliminate counter pressure fillers or reduce the operating pressure of the same following the production of a carbonated beverage under a closely controlled degree of carbonation.

It is a further object of the invention to provide a system of the aforementioned type with accurate control mechanisms to carbonate a beverage in a predictable repeatable manner.

Other and further objects of the invention will be apparent from the following description taken in conjunction with the accompanying drawings.

In accordance with the above objects, a system for continuously preparing a carbonated product and filling containers with the same is provided which includes, in series, a carbonator, a stabilizing tank, a pressure reduction tank, and a filler. After a carbonated product is formed by applying carbon dioxide to flowing liquid in the carbonator, it is passed to a stabilizing tank which includes a valve assembly connected to a source of carbon dioxide under pressure for regulating the head pressure of carbon dioxide over carbonated product at least equal to the carbonating pressure. Thereafter, the carbonated product is passed to the pressure reduction tank which includes a second valve assembly for regulating the head pressure of carbon dioxide over carbonated product at a predetermined level below carbonating pressure. Then the carbonated product is passed directly to a filler in which it is dispensed into containers. The difference in pressure between the stabilizing tank and the containers is determined by the desired container flow rate. For example, for 15 to 20 G.P.M. of product flow to the filler, this differential is on the order of 2 to 3 p.s.i.g.

The advantage of the foregoing system is predicated upon the principle that by maintaining a stabilizing tank at a pressure at least equal to the carbonating pressure, the carbon dioxide bubbles introduced in the carbonator are collapsed into solution in a relatively stable state. Thereafter, the pressure of the thus-stabilized carbonated product may be reduced substantially, to a level which will provide a proper rate of filling. It has been discovered that by utilizing such a pressure reduction tank, a counter pressure filler may be replaced by a gravity filler or, if desired, a relatively low vacuum filler. If the system is used for relatively highly carbonated products, the counter pressure filler may be employed with the advantage that the operating pressure is lowered resulting in less wear on the cylinders, lower operating costs, and a lower incidence of container breakage.

BRIEF DESCRIPTION OF THE DRAWING

The drawing is a schematic diagram in accordance with one embodiment of the present invention with an enlarged view of the container to be filled.

DETAILED DESCRIPTION OF THE PREFERRED EMBODIMENTS

Referring to the drawing, a system in accordance with one embodiment of the invention is shown, wherein a source of warm liquid to be carbonated is connected through a line 11 to a stabilizing tank 12. Gaseous carbon dioxide from a pressurized source 13 is directed into carbonator 14 in line 11 through a suitable two-way valve 16.

Gaseous carbon dioxide may be introduced into carbonator 14 suitably of the type described in U.S. Pat. No. 3,256,802, incorporated herein by reference. Briefly, carbonator 14 comprises a liquid-tight inner housing 17 disposed within an enlarged outer housing 18. Housing 17 includes a cylindrical tube with conical front and rear ends formed of a porous or sintered material with sufficient porosity (e.g., about 2–5 micron openings) to permit the passage of carbon dioxide bubbles of a desired small size without requiring undue pressure applied from carbon dioxide source 13 for such emission. The gas is emitted into the liquid by use of high pressure carbon dioxide.

Carbonation may also be performed with liquid carbon dioxide, if desired, by means of a liquid carbon dioxide injection valve 15 connected to a suitable source of liquid carbon dioxide from a conventional precision high pressure metering pump. As illustrated, valve 15 projects from line 11 in a T-shaped configuration and includes a spring loaded plunger 15a seated to block carbon dioxide flow until release under a predetermined pressure (e.g. 1,000p.s.i.).

In a typical instance, liquid carbon dioxide is maintained in a storage tank at approximately 0°F with a head pressure of approximately 300 pounds per square inch. The liquid carbon dioxide expands or explodes into a gaseous state in the carbonator forming bubbles of a size comparable to gaseous injection in carbonator 14. The refrigeration or cooling effect generated by the liquid carbon dioxide expanding into the product liquid may be increased by increasing the injection pressure. This reduction of temperature renders the carbonated liquid susceptible to increased amounts of carbon dioxide. Also, the pressure in stabilizing tank 12 for forming a stable product is reduced with lower temperatures. Of course, the amount of refrigeration supplied for the finished product, as through auxiliary coolers, is reduced by the amount of refrigeration generated by liquid carbon dioxide being transformed into a gaseous state.

A flow switch 19 operatively connected to a pump for liquid to be carbonated is synchronously associated with either valve 16 which controls the supply of gaseous carbon dioxide to carbonator 14 or injection valve 15 for liquid carbon dioxide, or both, if a combination is employed as described above. In this manner, liquid supplied to line 11 and carbon dioxide to the carbonator 14 are applied or stopped simultaneously in response to further control mechanism described hereinafter. This serves to prevent overcarbonation or undercarbonation in the carbonator 14.

Gaseous carbon dioxide carbonator 14 and liquid carbon dioxide injector valve 15 may be both installed in line 11 with the former utilized as a back-up mechanism for carbonating if the liquid system fails.

Stabilizing tank 12 is provided with a level control electrode assembly 20 which includes upper and lower level electrode pairs 21 and 22, respectively. Electrode pair 21 is operatively associated with normally open valve 16 and liquid flow switch 19 and serves to simultaneously shut off flow of liquid and gas upon the liquid level in stabilizing tank 12 rising to contact the electrode pair. Electrode pair 22 is also operatively associated with valve 16 and flow switch 19 and serves to open the same in response to a lowering of the liquid level in stabilizing tank 12 below the electrode contact point. Thus, level control assembly 20 serves to maintain the liquid level in stabilizing tank 12 between two predetermined limits.

A valve assembly for regulating the head pressure of carbon dioxide over carbonated product is provided for stabilizing tank 12 and includes a solenoid relief valve 23 and a pressure regulating valve 24 connected to a source of carbon dioxide 26. With the system in operation, and valves 23 and 24 closed, carbon dioxide gas escaping from the product would maintain a pressure in the head space of the stabilizing tank 12 approximately equal to the carbonating pressure in carbonator 14. Regulating valve 24 may be set to pass carbon dioxide into tank 12 at a carbonating pressure for increased product stability without carbon dioxide vaporization from the product. Certain products (e.g., grapefruit juice) require pressure in the stabilizing tank 12 in excess of carbonating pressure. This would not raise the degree of carbonation which is determined by the independent flow rate of carbon dioxide gas through valve 16 into carbonator 14. The product is held in stabilizing tank 12 for sufficient time to stabilize the product at the tank operating pressure.

Product flows from stabilizing tank 12 to a pressure reduction tank 27 along line 28 provided with a product flow sensor 29 which serves to detect the stoppage of flow to the filler assembly. Relief valve 23 is controlled to open in response to detection of the following system flow indications: (a) liquid flow switch 19—open, (b) flow sensor 29 indicating a stoppage of product flow to the filler assembly, and (c) electrode assembly 20 indicating the product level in tank 27 between electrode pairs 21 and 22. When a combination of (a), (b) and (c) exists, the product level in stabilizing tank 12 would be rising at a sufficiently fast rate to cause compression of the head space gas with a consequent undesirable raise of pressure in the tank. Automatic opening of relief valve 23 serves to prevent this. When product flow to the filler assembly recommences, the product flow sensor 29 automatically closes relief valve 23 since the danger of rapid compression is eliminated. If the product level in stabilizer tank 12 continues to rise without recommencing of filling, the liquid level will eventually contact upper electrode pair 21. As previously discussed, this contact automatically actuates closing of the liquid flow switch 19 and so the product pump. Relief valve 23 is also actuated to close by such contact. Thus, valve 23 is only open when liquid is being pumped through flow switch 19 into tank 23 and there is a stoppage of product flow to the filler.

Pressure reducing tank 27 includes a level control assembly 30 with a normally open two-way valve 31 in line 28 operable to close when the liquid level in the rank rises above a predetermined level and to open when the liquid level is below that level. In the illustrated embodiment, level control assembly 30 is capable of causing the system to seek a throttling position in which an essentially constant product flow rate and level in the tank are achieved.

Valve 31 is operated by a float 32 connected through an arm 33 to a pivot base 34. Float 32 actuates a piston assembly 36 which serves to open or close product liquid flow through valve 31. Assembly 36 includes a valve housing 37 in which a slidable piston or membrane 38 is spring loaded to move downwardly to close valve 31 in response to gas pressure exerted on its upper side and to move upwardly and open valve 31 in response to release of the gas pressure.

A gas flow assembly is provided to exert and release gas pressure upon membrane 38 in response to the liquid level in tank 27 which comprises a gas conduit 39 communicating at one end with the head space of tank 27 and at the other end with the upper face of membrane 38. A plug 40 is connected by a rod 41 to a central portion of float arm 33 and is seated in an expanded portion of conduit 39. Plug 40 serves to block gas flow in conduit 39 with the liquid below a predetermined level so that arm 33 pivots downwardly to sealingly seat plug 40. When the liquid level rises above the predetermined level to a sufficient extent, plug 40 is unseated and gas from the head space in tank 27 is permitted to flow in line 39. A gas bleed valve such as a needle valve 42, partially cracked open, is provided in the gas stream between tank 27 and membrane 38, illustrated in valve housing 37, and serves to bleed off pressure at a predetermined rate.

In operation of level control assembly 30, when the liquid exceeds the predetermined level, plug 40 is unseated and gas flows in line 39 at a higher rate than the bleed-off through valve 24 to urge membrane 38 to move downwardly and close valve 31 to stop the flow of product into tank 27. This product flow stoppage causes the liquid level in tank 27 to fall below the predetermined height to again seat plug 40 and seal gas in tank 27 from line 39. Thereafter, the gas slowly bleeds from valve 42 to permit the upward movement of spring loaded membrane 38 and to again open valve 31. By a suitable selection of the bleed-off rate through valve 42, the level control assembly seeks an essentially constant flow rate in tank 28 with a relatively short delay time.

Pressure reducing tank 27 is provided with a valve assembly for regulating the head pressure of carbon dioxide over the carbonated product in the tank and includes a pressure relief valve 43 and an optional pressure regulating valve 44 connected to an optional source of carbon dioxide 46. Relief valve 43 is set at a pressure sufficiently above that in the filler to provide the desired rate of filling, as explained hereinafter. Since the operating pressure of tank 27 is below that of stabilizing tank 12, the beverage will release a certain amount of carbon dioxide which, if not released through relief valve 43, will cause the head pressure to increase until it equals the pressure in the stabilizing tank. The product is held at the operating pressure of tank 27 for sufficient time to stabilize the product at that pressure. In order to maintain the same degree of product carbonation with tank 27 maintained at a higher pressure than tank 12, the gas flow through valve 16 into the carbonator is proportionally increased to compensate for the release of carbon dioxide from the product during pressure reduction.

For a product requiring a pressure in tank 12 substantially in excess of carbonating pressure, after a pressure reduction of, for example, 2-10 p.s.i.g., the pressure in tank 27 may still be in excess of carbonating pressure. Even so, this would be useful to lower the pressure in the filler.

A filler assembly schematically illustrated at 47 is connected through a product line 48 to pressure reducing tank 27. For clarity, the filler assembly is illustrated in conjunction with an enlarged bottle 49 resting on a platform 50 and includes a centering cup 51 through which projects in gas sealing engagement outlet 52 for product line 48 and gas vent tube 53.

In the illustrated embodiment, gas may be drawn under a low vacuum through optional vacuum pump 54 in which case the filler is of the vacuum type. Although a vacuum filler is normally employed for non-carbonated beverages, it may also be employed in a system in which the carbonation is at a sufficiently low level that substantial amounts of carbon dioxide are not lost upon the application of a mild vacuum (e.g., up to about 3 p.s.i.g. of pressure). The purpose of applying the vacuum is to reduce the pressure head required in pressure reducing tank 27 in order to fill bottles 49 at a desired flow rate. As previously stated, this pressure differential is the determinant of flow rate.

By elimination of optional vacuum pump 54, the gas in bottle 49 exits through vent tube 53 to atmospheric pressure as the product liquid fills the container. Such a filler is referred to as a gravity filler. One type of gravity filler employs a filler bowl for distribution into the various containers. Another type of gravity filler has a central distribution valve with a separate product outlet to each filling valve.

A conventional gravity or low pressure filler of the central distribution valve type delivers product to the filler by pumping. This method of product delivery could not produce a uniform final carbonated product because the pump pressure varies considerably with the filler speed which is subject to large variations as if containers were missing on some of the valves. Such excessive pressure variation would alter the level of carbonation and stability of the final product. With the utilization of a pressure reducing tank 27, a uniform carbonated product may be produced with a centrally distributed gravity or vacuum filler because the flow rate to the filler is set by the pressure differential between tank 27 and the filler regardless of any vacancy of some of the filler valves.

The utilization of the pressure reducing tank enables the present system to be employed with the aforementioned gravity or vacuum type of filler in place of the considerably higher investment in a counter pressure type of filler.

A counter pressure filler may be employed advantageously according to the present invention since the counter pressure required may be reduced to any desired degree by preliminarily reducing the pressure in tank 27 prior to filling. For example, if the filler is operated at a speed that requires 15 to 20 G.P.M. of product flow to the filler, the operating pressure in the counter pressure filler is set to be 2 to 3 p.s.i.g. below the operating pressure in tank 27. Thus, reduction of the tank pressure enables a counterbalancing reduction of operating pressure in the filler. The operation of a conventional counter pressure filler is fully described in the aforementioned U.S. Pat. No. 3,256,802, incorporated at this point by reference.

It should be understood that the present system is applicable to any carbonated beverage including soft drinks, artificially carbonated wines, beer, and the like. For soft drinks, conventional syrup and water are mixed and cooled to form the liquid to be carbonated as in the conventional equipment described in the aforementioned U.S. Pat. No. 3,256,802.

In a typical operation of the system of the present invention, the desired rate of filling is first determined and the remainder of the system is adjusted accordingly. Assuming a product flow rate of 15 to 20 gallons per minute, the pressure drop from tank 27 to the filler would be on the order of 2 to 3 pounds. If a higher capacity filler were employed, say, 50 to 60 gallons per minute of product, the same pressure drop would increase to 4 to 5 p.s.i.g.

EXAMPLE 1

Carbonation of a cold soft drink at 3.7 volumes of carbon dioxide is illustrated at a flow rate to a counter pressure filler of 15 to 20 G.P.M. A mixture of water and syrup (herein "liquid") is pumped through line 11. Valve 16 is set to deliver carbon dioxide at the required flow rate to carbonator 14 in line 11. Alternatively, if carbon dioxide is supplied in a liquid state, a liquid carbon dioxide metering pump is set for a finished carbonation of 3.7 volumes carbon dioxide. A cooler, not shown, is employed to lower the final beverage temperature to a value on the order of 34°F at which the carbon dioxide equilibrium pressure is approximately 20 p.s.i.g.

Stabilizing tank 12 is adjusted to operate with a head pressure of slightly above carbonation pressure, say, at 30 p.s.i.g. operating pressure by an appropriate setting of regulator 24, to stabilize the collapsed bubbles of carbon dioxide in the carbonated product.

Following stabilization, the carbonated product is directed to pressure reduction tank 27 wherein it is subjected to a lower operating pressure of, say, 15 p.s.i.g. by setting relief valve 43. Lowering the pressure to a value below the carbonation pressure of 20 p.s.i.g. is feasible without a massive loss of carbon dioxide because the carbon dioxide has been stabilized in the product in tank 12.

The beverage is then directed to the counter pressure filler which is operated at a value which is less than the 15 p.s.i.g. in tank 27 by an amount that will produce the desired flow rate. As previously discussed, this pressure differential is on the order of 2 to 3 p.s.i.g. for a product flow rate of 15 to 20 G.P.M. Thus, the counter pressure would be 17 to 18 p.s.i.g. If this pressure differential were substantially higher than this level for the predetermined flow rate, substantial foaming would occur.

By utilizing pressure reducing tank 27 in the above system, the required counter pressure in the filler assembly was substantially reduced with a consequent reduction in wear on the pressurized lift cylinders, less maintenance, and a reduction in the risk of container damage.

EXAMPLE 2

In this example, the counter pressure filler was completely eliminated for a moderate to low carbonated wine using a gravity filler. The desired final product is carbonated to 1.75 volumes carbon dioxide at an ambient temperature of 65°F which is equivalent to a carbonation equilibrium pressure of about 13 p.s.i.g. A desirable pressure in stabilizing tank 12 for this degree of carbonation would be somewhat in excess of this equilibrium value, say, on the order of 20 p.s.i.g. Following stabilization, the head pressure in tank 27 is considerably reduced to a value of, say, 3 to 5 p.s.i.g., depending upon the desired flow rate by an appropriate setting of pressure relief valve 43. After pressure reduction, the product flows directly through line 48 into the gravity filler maintained at atmospheric pressure. For this type of product, a counter pressure filler is not required and so the capital outlay and operating costs are considerably reduced along with the risk of container damage due to applying counter pressure.

The foregoing system is capable of producing a final product with an extremely uniform degree of carbonation regardless of variance in flow rates and the like. As previously discussed, the amount of carbon dioxide supplied to carbonator 14 is independent of the pressure level in either the stabilizing tank 12 or the pressure reducing tank 27 which adds to the uniformity of the carbonation. Furthermore, the carbon dioxide supplied through valve 16 and the liquid metered through flow switch 19 are synchronously operated so that the stoppage of liquid and gas occurs simultaneously. Excessive pressure buildup in stabilizing tank 12 is prevented by the opening of relief valve 23 in the major situation in which this could occur, namely when stoppage of flow to filler assembly 47 is detected by sensor 29 and the liquid flow switch is on with liquid rapidly rising in the stabilizing tank. When the liquid level reaches the upper electrode pair 21, the liquid flow to the stabilizer tank is stopped and pressure relief valve 23 is closed with carbon dioxide being supplied through regulator 24 to achieve the desired head space pressure.

A unique level control assembly 30 is provided for pressure reducing tank 27 to maintain the liquid therein at a relatively constant level. This enables a single setting of the relief valve to produce the desired pressure for filling rather than constant adjustment as the liquid level rises and falls.

It is apparent from the foregoing that a carbonation and filling system is provided in which the carbonated product is first stabilized and thereafter the pressure is reduced, prior to filling, without substantial losses of carbonation. In this manner, filling can be accomplished without excessive foaming and with either elimination of the use of a counter pressure filler or a large scale reduction of the operating pressures of the same.

I claim:

1. In a system for continuously preparing a carbonated beverage product and filling containers with the same, a stabilizing tank, a source of liquid to be carbonated, a line connected between said liquid source and said stabilizing tank, a source of carbon dioxide under pressure, carbonating means connected to said source of carbon dioxide and disposed in said line for applying carbon dioxide to flowing liquid to be carbonated to form a carbonated product before entry into the stabilizing tank, first valve means disposed between said stabilizing tank and a source of carbon dioxide under pressure for regulating the head pressure of carbon dioxide over carbonated product in said stabilizing tank, a pressure reduction tank, a line connected between said stabilizing tank and said pressure reduction tank, second valve means connected to said pressure reduction tank for regulating the head pressure of carbon dioxide over carbonated product in said tank, a filler for dispensing carbonated product, a line directly connected between said pressure reduction tank and filler providing open communication therebetween so that the pressure in said filler is determined by the head pressure in the pressure reduction tank.

2. A system as in claim 1 together with a level control means for said pressure reduction tank including a valve operable to close when the liquid level in the tank is above a first predetermined level and to open when the liquid level is below the same level, said valve being disposed in the line between said stabilizing tank and pressure reduction tank.

3. A system as in claim 2 in which said level control means includes a float in said pressure reduction tank, piston means, a line connecting said float and piston means, said piston means being operable to close said valve in response to exertion of gas pressure in the line and to open the same in response to release of gas pressure therein, plug means for blocking and unblocking gas flow in said last named line in response to the float moving to a position corresponding to said first and second predetermined levels respectively, and a gas bleed opening in said line between said plug means and piston means, whereby with liquid above said predetermined level the plug means unblocks gas flow in said line to urge said piston means to close said valve, and with liquid below at the predetermined liquid level the plug means blocks gas flow in said line, and gas pressure is reduced through said bleed-off opening to move said piston to a valve opening position.

4. A system as in claim 1 in which said second valve means includes a relief valve operable to vent gas from said pressure reduction tank when the gas pressure therein exceeds a predetermined level.

5. A system as in claim 1 together with relief valve means for releasing gas head pressure in the stabilizing tank.

6. A system as in claim 5 in which said relief valve means including first sensing means for detecting the stoppage of carbonated product flow to said filler, a second sensing means for detecting liquid flow to said stabilizing tank, and means responsive to detection by said first and second sensing means for opening said relief valve.

7. A system as in claim 6 together with a switch having an open and closed position for sensing the flow of liquid to be carbonated in the line to the stabilizing tank and in which said second sensing means is operable in response to the open switch position.

8. A system as in claim 1 together with a first switch having a first and second position for respectively opening and closing the flow of liquid to be carbonated to the stabilizing tank and a second switch having a first and second position for respectively opening and closing the flow of carbon dioxide to the carbonator, and level control means for said stabilizing tank operable to synchronously actuate said first and second switches to said first positions when the liquid level in said stabilizing tank is below a first predetermined level and to said second position when the liquid level is above a second predetermined level.

* * * * *